C. LEA.
MECHANISM FOR AND PROCESS OF CONSTRUCTING CHENILLE.
APPLICATION FILED NOV. 2, 1916.

1,328,570.

Patented Jan. 20, 1920.
10 SHEETS—SHEET 1.

Inventor
Charles Lea

C. LEA.
MECHANISM FOR AND PROCESS OF CONSTRUCTING CHENILLE.
APPLICATION FILED NOV. 2, 1916.

1,328,570.

Patented Jan. 20, 1920.
10 SHEETS—SHEET 3.

Inventor
Charles Lea
by Emery, Booth, Janney & Varney
Att'ys

C. LEA.
MECHANISM FOR AND PROCESS OF CONSTRUCTING CHENILLE.
APPLICATION FILED NOV. 2, 1916.

1,328,570.

Patented Jan. 20, 1920.
10 SHEETS—SHEET 4.

Inventor
Charles Lea
by Emery Booth, Janney and Varney
Att'ys

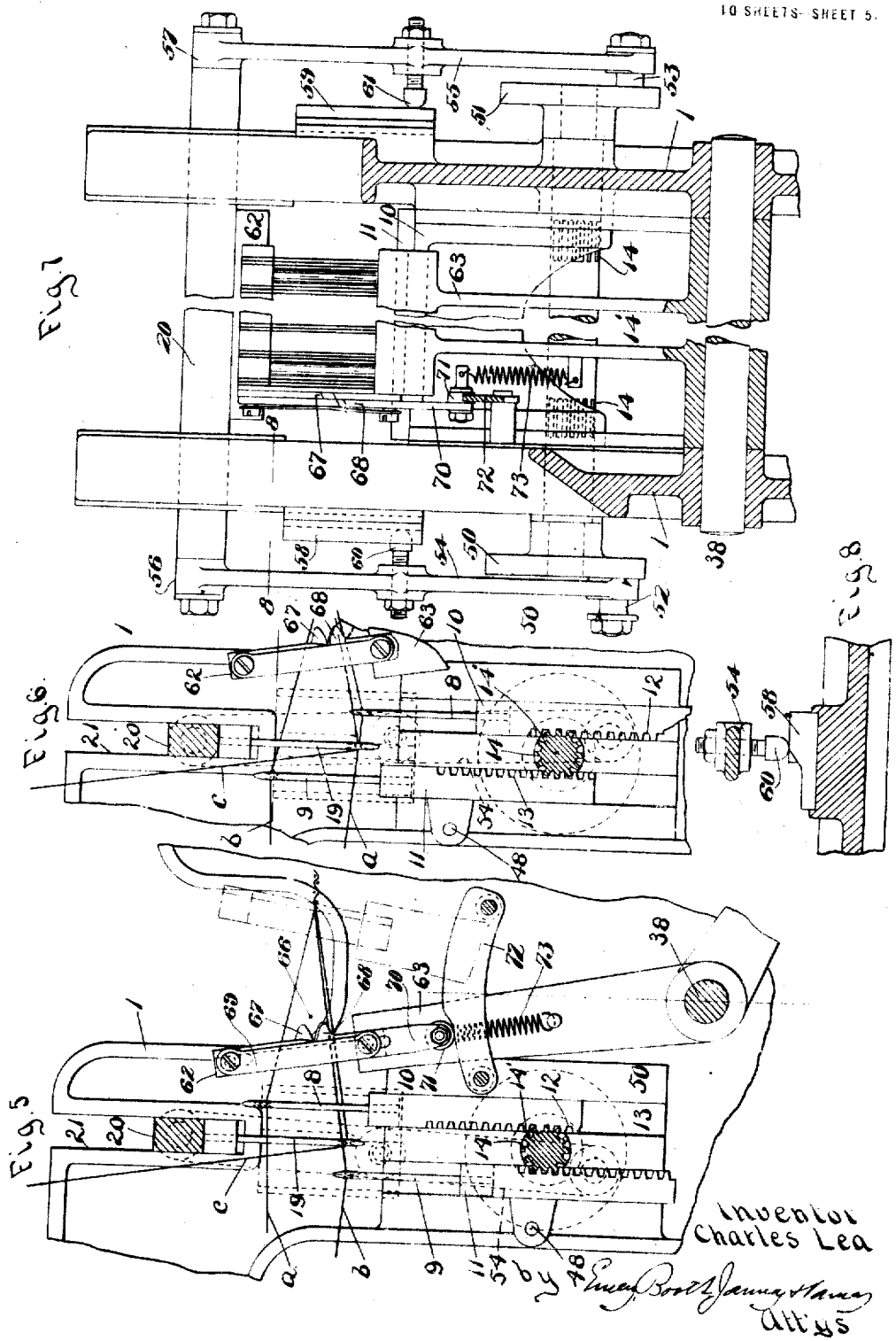

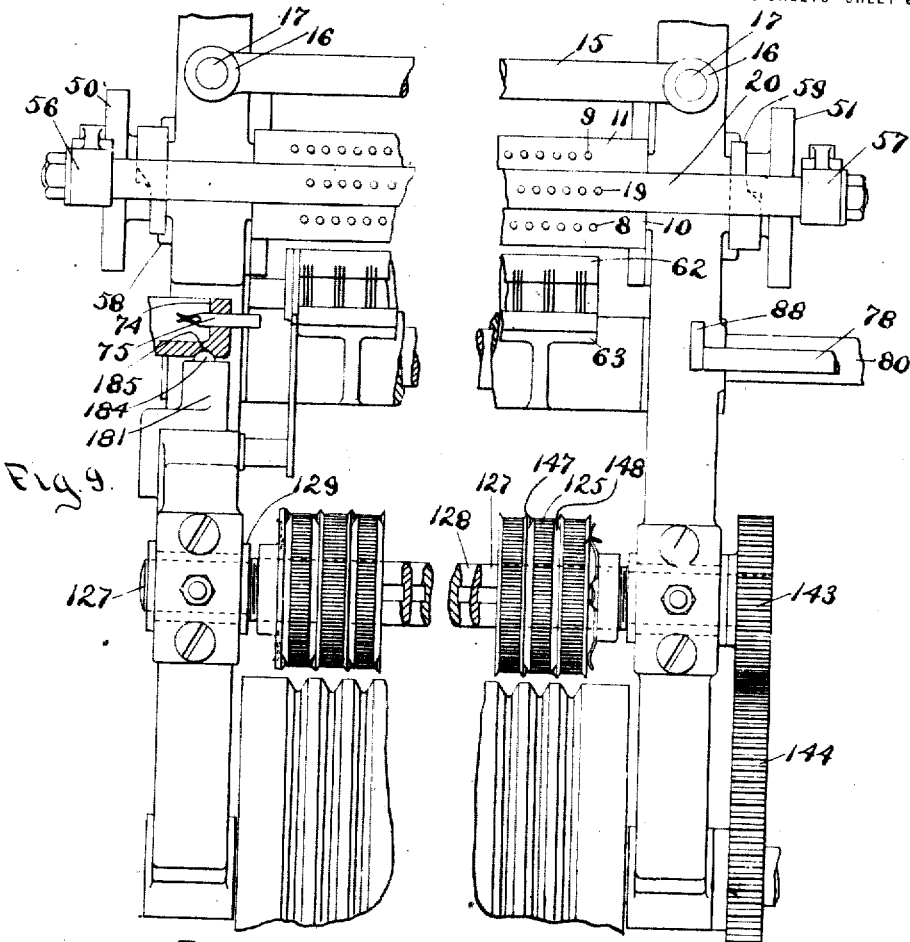
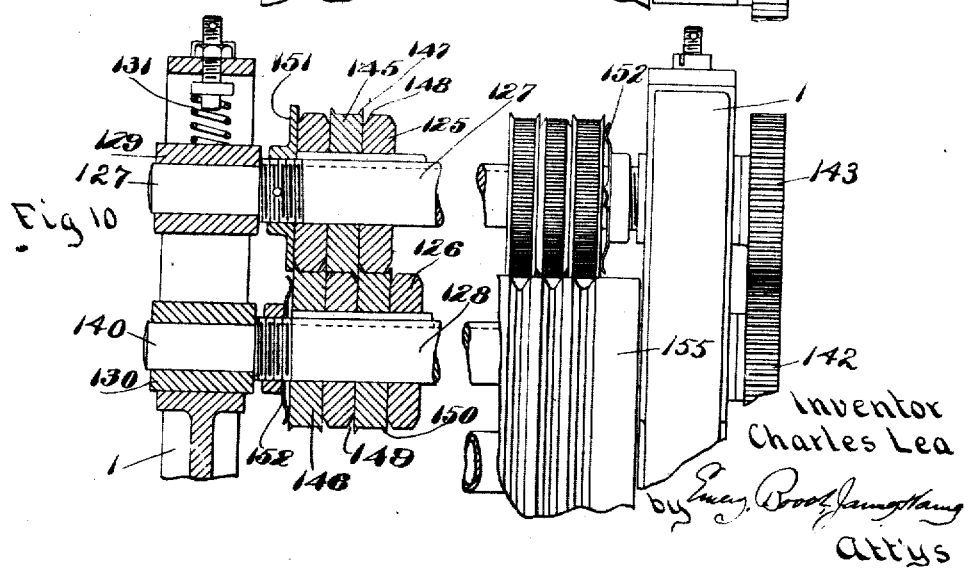

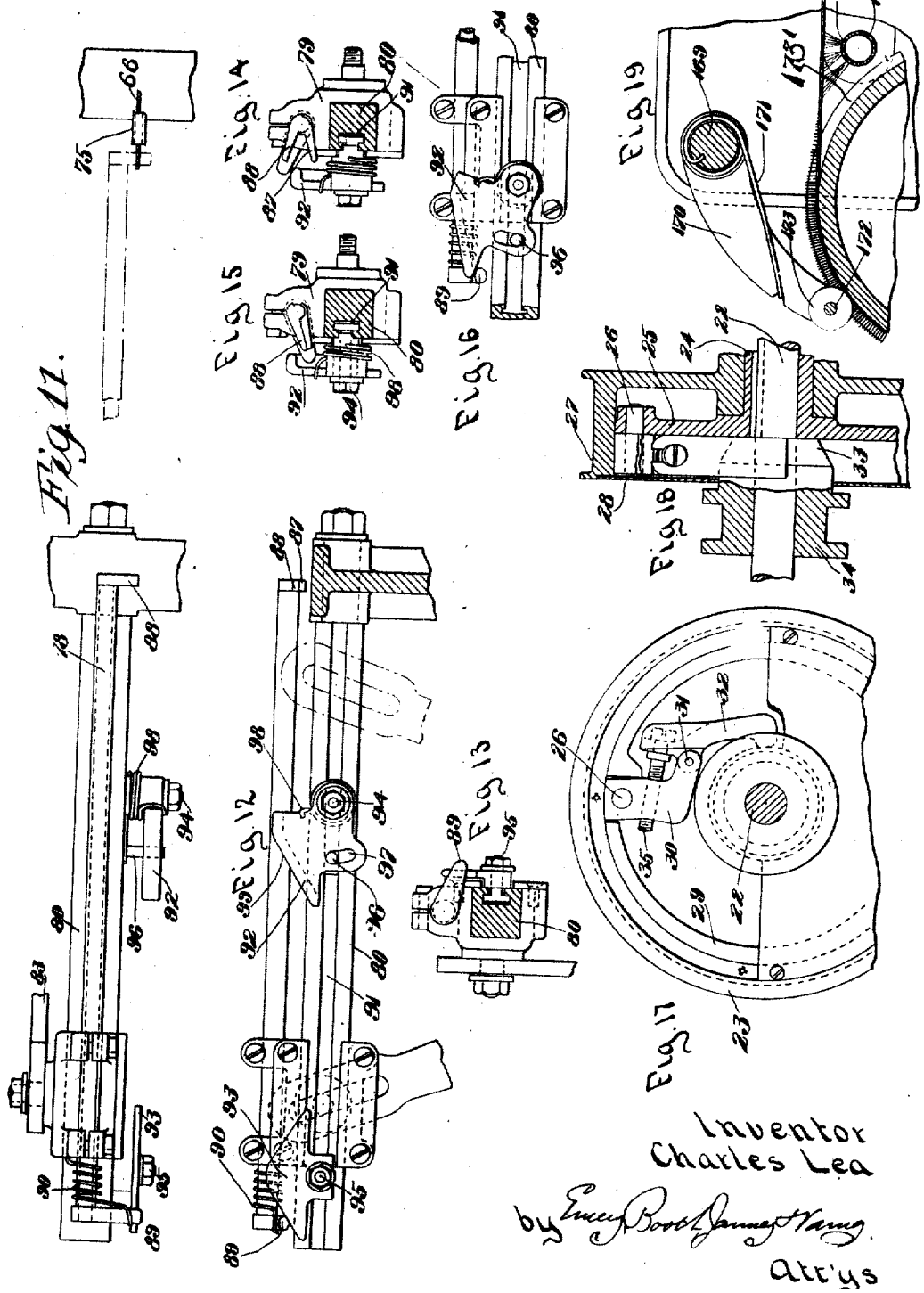

C. LEA.
MECHANISM FOR AND PROCESS OF CONSTRUCTING CHENILLE.
APPLICATION FILED NOV. 2, 1916.
1,328,570.
Patented Jan. 20, 1920.
10 SHEETS—SHEET 8.
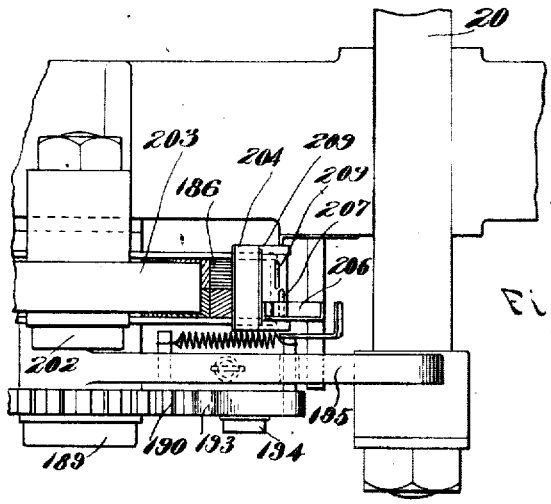
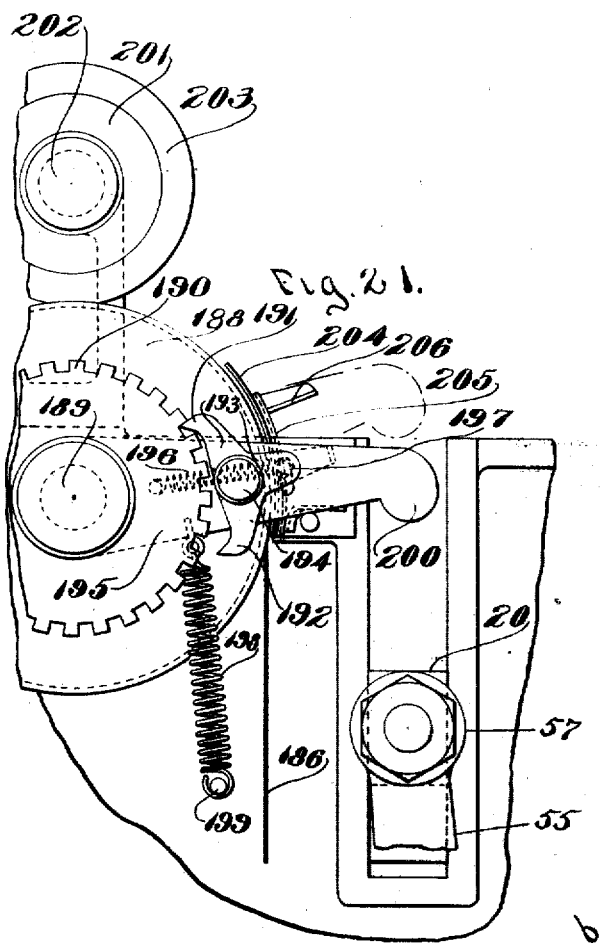
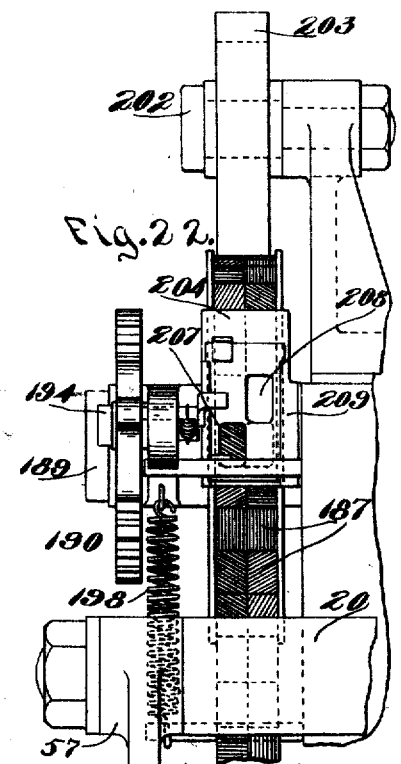
Inventor
Charles Lea
by Emery, Booth, Janney & Varney
Attys

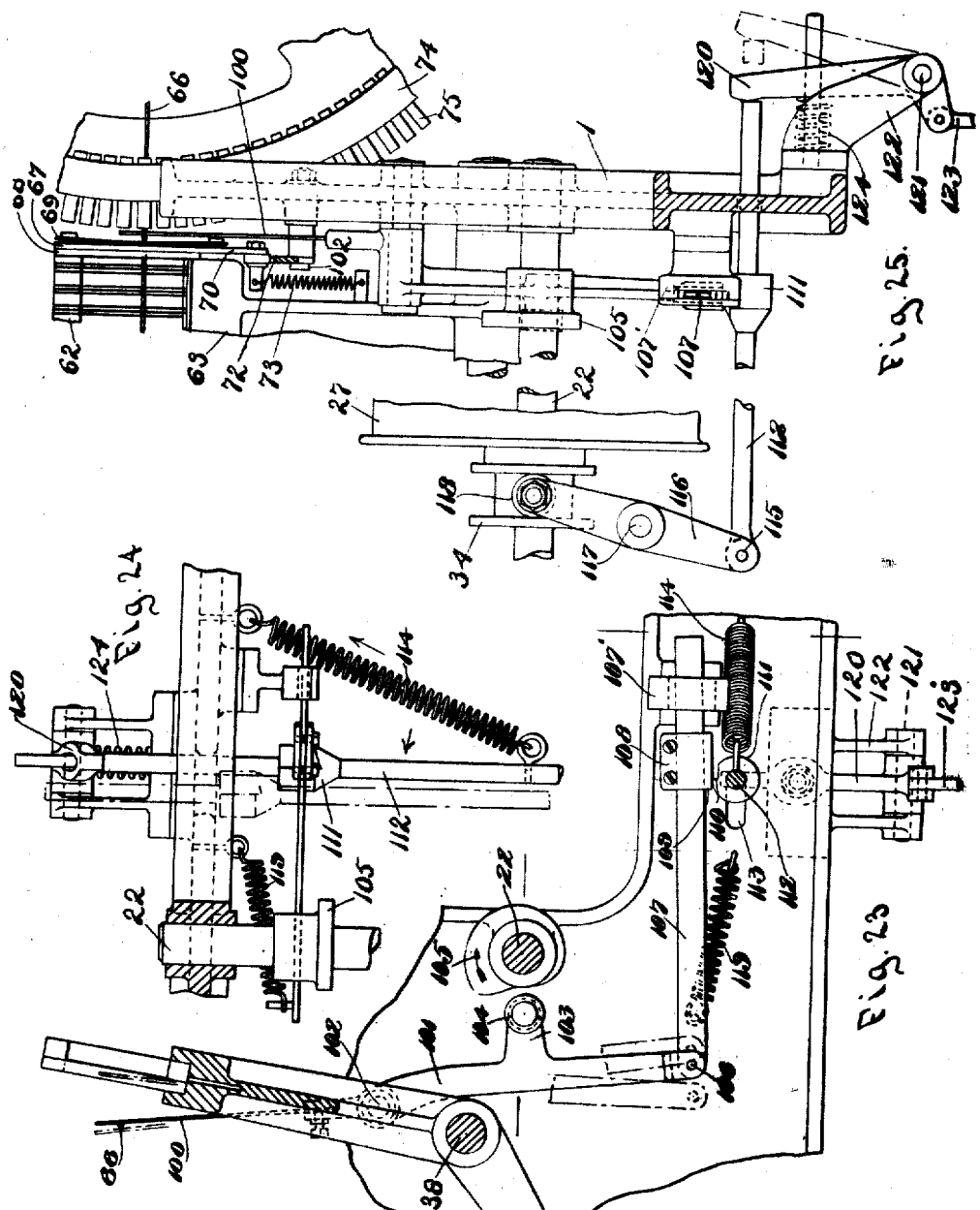

C. LEA.
MECHANISM FOR AND PROCESS OF CONSTRUCTING CHENILLE.
APPLICATION FILED NOV. 2, 1916.
1,328,570.
Patented Jan. 20, 1920.
10 SHEETS—SHEET 10.
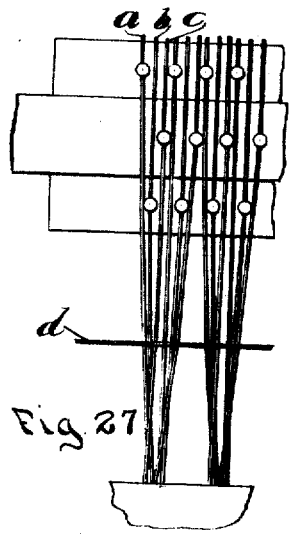
Fig. 27
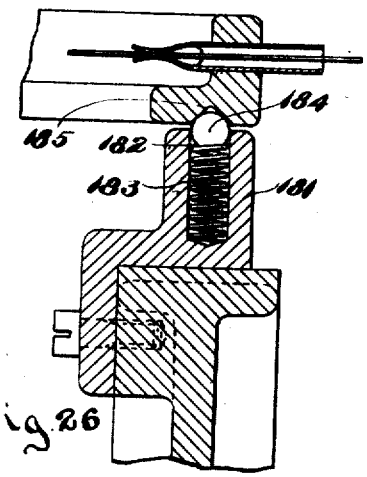
Fig. 29
Fig. 26
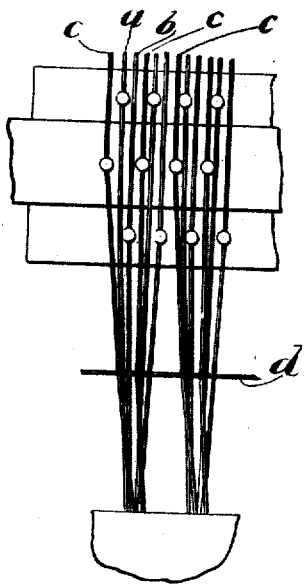
Fig. 28
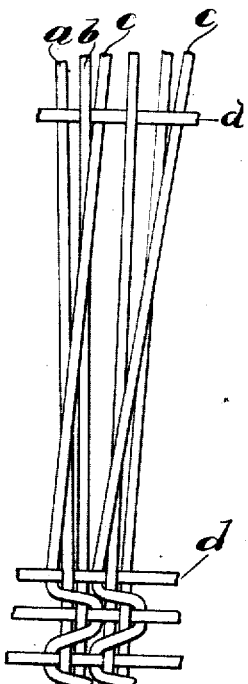
Fig. 31
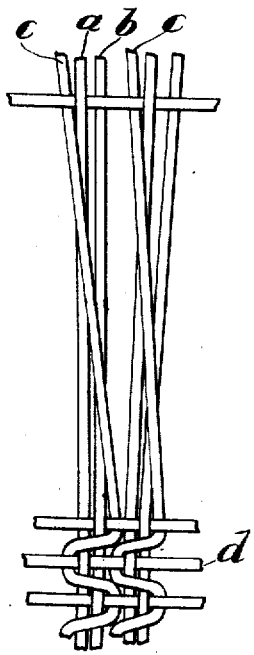
Fig. 30
Inventor
Charles Lea
by Emery Booth James Varney
Attys

UNITED STATES PATENT OFFICE.

CHARLES LEA, OF BOSTON, MASSACHUSETTS, ASSIGNOR, BY MESNE ASSIGNMENTS, TO McCLEARY, WALLIN AND CROUSE, OF AMSTERDAM, NEW YORK, A CORPORATION OF NEW YORK.

MECHANISM FOR AND PROCESS OF CONSTRUCTING CHENILLE.

1,328,570.

Specification of Letters Patent. Patented Jan. 20, 1920.

Application filed November 2, 1916. Serial No. 129,072.

*To all whom it may concern:*

Be it known that I, CHARLES LEA, a citizen of the United States, and a resident of Boston, county of Suffolk, and State of Massachusetts, have invented an Improvement in Mechanism for and Processes of Constructing Chenille, of which the following description, in connection with the accompanying drawings, is a specification, like characters on the drawings representing like parts.

This invention relates to mechanism for and to a process of constructing chenille or like material.

In order that the invention may be clearly understood I have in the accompanying drawings disclosed one type or embodiment thereof, and constituting means or mechanism by which the process of my invention may best be practised.

In said drawings:

Fig. 5 is a detail in side elevation and longitudinal section showing the warp harnesses and the doup harness in one position;

Fig. 6 is a similar view but representing the warp harnesses in another position;

Fig. 7 is a detail mainly in vertical transverse section with parts broken away and representing means for moving the doup harness;

Fig. 8 is a section on the line 8—8, Fig. 7, showing one of the cams for imparting lateral or shogging movement to the doup harness;

Fig. 9 is a plan view of the machine with certain parts omitted and with parts broken away;

Fig. 10 is a view, partially in elevation and partially in transverse section, showing mainly the chenille cutting rolls and the heating drum;

Fig. 11 is a plan of the weft needle or filling carrier and certain of the operating means therefor, the needle being represented in dotted lines at the right as grasping the weft thread;

Fig. 12 is a front elevation of the mechanism shown in Fig. 11;

Fig. 13 is a vertical section on the line 13—13 of Fig. 12 looking toward the right in said figure;

Fig. 14 is a vertical section of the mechanism shown in Fig. 12 and representing the needle as moving toward the right in said figure;

Fig. 15 is a view similar to Fig. 14 but representing the needle at the extreme right hand end of its stroke;

Fig. 16 is a detail mainly in front elevation and representing the needle farther to the left than in Fig. 12;

Fig. 17 is a view in side elevation with parts broken away of the driving pulley and related parts;

Fig. 18 is a view in vertical section of the parts shown in Fig. 17;

Fig. 19 is a detail in vertical section showing the means for steaming or moistening the chenille and for forming under the influence of heat the same;

Fig. 20 is a detail in plan of a pattern or color indicating apparatus that may be employed in the practice of my invention;

Fig. 21 is a side elevation of the parts shown in Fig. 20;

Fig. 22 is a front elevation of the parts shown in Figs. 20 and 21;

Fig. 23 is a view in vertical longitudinal section of the weft feeler or stop mechanism and related parts;

Fig. 24 is a detail mainly in plan of portions of the said stop mechanism;

Fig. 25 is a view mainly in front elevation and partially in section of the said stop mechanism;

Fig. 26 is a view in vertical section of the weft thread magazine and the detent means therefor;

Figs. 27 and 28 are somewhat diagrammatic illustrations of the warp, doup and weft threads at different stages of the weaving or chenille constructing operation;

Fig. 29 is a transverse section taken through a chenille strip;

Fig. 30 is a diagrammatic illustration of the chenille threads and the resulting fabric, the threads being positioned as indicated in Fig. 27; and Fig. 31 is a similar illustration, the threads being positioned as indicated in Fig. 28.

Figure 1:
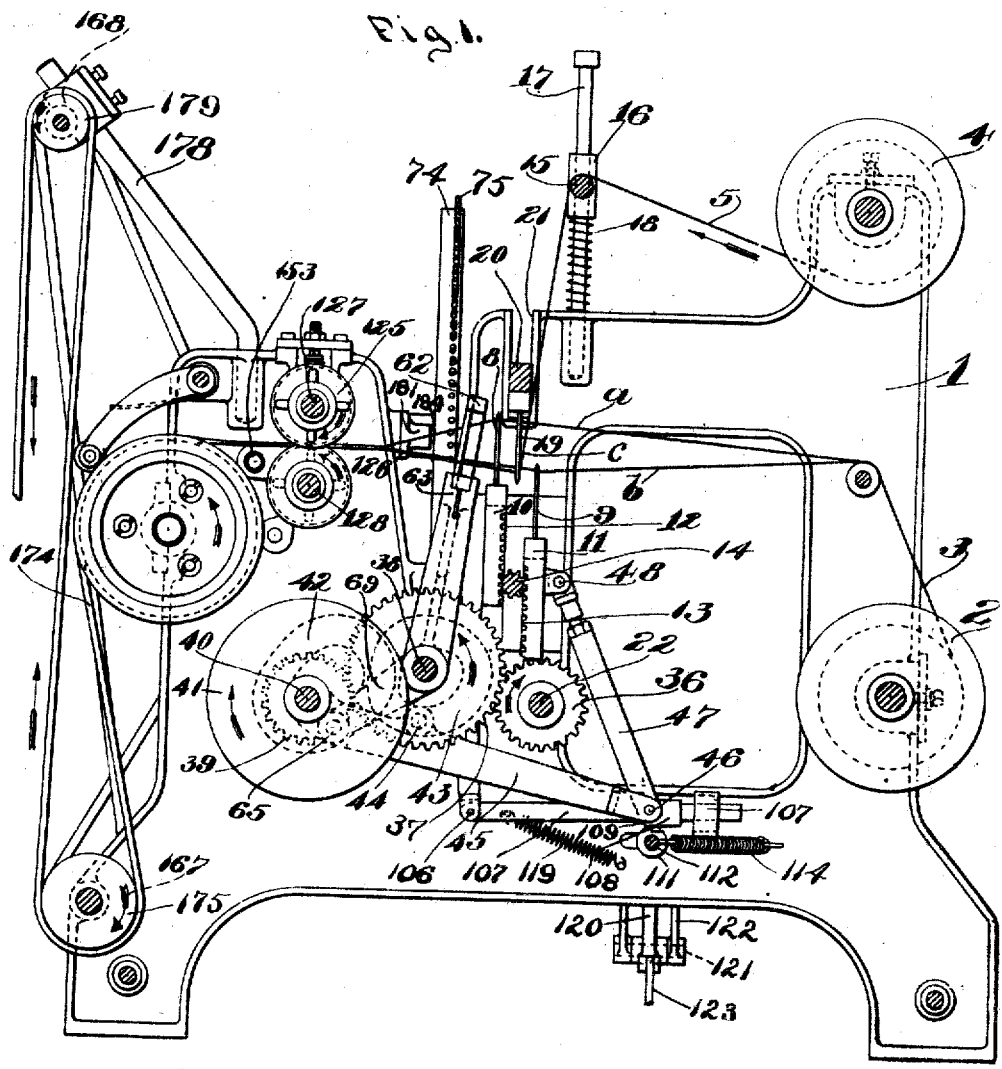
Figure 1 is a view, partly in side elevation and partly in vertical longitudinal section of an organized machine for constructing chenille in accordance with my invention.

Referring more particularly to the accompanying drawings, wherein I have represented a single embodiment only of my invention, and first to Figs. 1 to 7, the framing of the machine is indicated generally at 1, it consisting of suitable side uprights connected by tie bars or otherwise. At the back of the machine I support a spool or beam 2 whereon the warp threads 3 are wound, and a spool or beam 4 whereon the doup threads 5 are wound. Each of said spools or beams is provided with a brake or tension strap or other means respectively shown at 6 and 7. The warp threads 3 are adapted to be shedded in any suitable manner, and I have herein represented the threads 3 as extending at *a* and *b* respectively through the eyes of needles 8, 9 equal in number to the total number of warp threads. The said needles 8, 9 are carried by the frames 10, 11 of the harnesses and at their inner faces said frames are provided with racks 12, 13 meshing with circumferentially formed teeth 14 upon a rock shaft 14', (see Fig. 7), whereby said heddle frames and their needles are oppositely reciprocated in a vertical plane.

The doup threads 5 preferably pass over a rod 15 whereby the slack may be taken up. For this purpose any suitable construction may be employed. I have herein represented said rod 15 as mounted upon sleeves 16 positioned for vertical sliding movement upon upright posts 17 carried by the framing of the machine. Suitable coil springs 18 are provided yieldingly to support the rod 15 in the position shown in Fig. 1.

The doup threads 5 extend through the eyes of needles 19 mounted in and depending from a doup harness frame 20 itself positioned for vertical sliding movement in guide ways 21 in the machine frame.

Movements of vertical reciprocation are imparted to the warp harnesses and movements of vertical reciprocation and of transverse or lateral reciprocation are imparted to the doup harness in any suitable manner. For this purpose I have herein represented the following organization of parts to which, however, I am in no wise limited.

Figure 2:
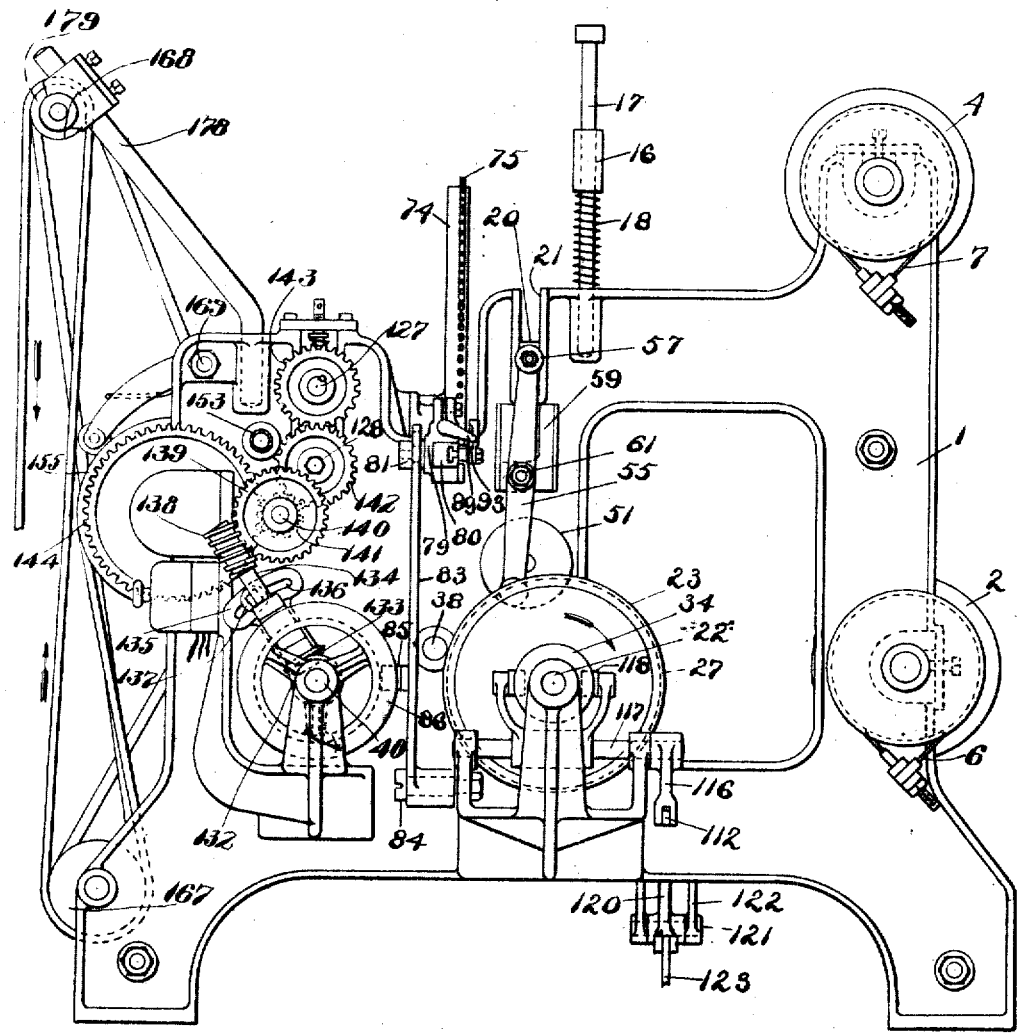
Fig. 2 is a side elevation of said machine.

Power may be conveyed to the machine in any suitable manner. Herein for the purpose I have represented the machine as having a drive shaft 22 mounted in suitable bearings in the machine frame, as indicated in Figs. 1 and 2 and having thereon a suitable driving pulley indicated generally at 23 in Fig. 17. The said drive shaft 22 has splined thereon a bearing hub 24 as shown in Fig. 18 and provided with a disk 25, itself having two diametrically positioned pins, one of which is shown at 26 in Figs. 17 and 18. Surrounding the said disk and loosely mounted upon the hub 24 is the belt receiving portion 27 of said pulley, herein shown as provided with a cover 28 for certain of the parts. Within and normally out of driving engagement with the loose pulley portion 27 is a divided ring 29, between the ends of which and pivotally mounted upon one of the pins 26 is a dog member 30 to which is pivotally secured at 31 a second dog member 32 adapted to ride upon the conical surface 33 of a spool 34, itself mounted upon the driving shaft 22 for axial movement thereon. A set screw 35 provides for suitable adjustment of the dog member 32. By movement of the spool 34 axially of the drive shaft 22 to the right, viewing Fig. 18, the divided ring 29 is brought into driving relation with the loose portion 27 of the pulley, and thereupon movement is imparted to the gear 36 shown in Fig. 1 as fast upon the drive shaft 22. Meshing with the gear 36 is a larger gear 37 loose on shaft 38, itself mounted for rocking movement in suitable bearings in the machine frame. Meshing with the gear 37 is a smaller gear 39 fast upon the shaft 40 mounted in the machine frame and having thereon a cam 41 provided with a cam track 42.

The gear 37 has in one face thereof a cam track 43 receiving a roll 44 on a lever arm 45 loosely mounted for rocking movement upon the shaft 40 and having pivotally connected at its outer end at 46 a connecting rod 47 itself pivotally connected at 48 to the warp heddle frame 11.

In this or in any other suitable manner, a movement of vertical reciprocation is imparted to the warp heddle frames 10, 11 and sheds are consecutively formed with the warp threads in a manner not herein necessary more fully to describe. In order to impart movements of vertical reciprocation to the doup harness frame, I have herein provided the shaft 14' indicated most clearly in Fig. 7, and have mounted upon the opposite outer ends thereof crank disks 50, 51, having crank pins 52, 53 receiving the ends of links 54, 55 and of sufficient length to permit slight sliding movement of said links in a direction axially of said shaft 14'. The upper ends of the links 54, 55 are formed as hubs 56, 57 and are suitably connected to the doup heddle frame. Upon the opposite sides of the framing are provided two cam surfaces 58, 59 which are oppositely positioned and upon which ride the heads of pins 60, 61 suitably tapped into the links 54, 55 about mid length thereof. One of said cam surfaces is indicated more in detail in Fig. 8. Since said cam surfaces are oppositely positioned, the construction and relation of parts are such that in the rocking movement of the shaft 14′ preferably through substantially 320° the doup heddle frame 20 is vertically reciprocated and at the same time is laterally or transversely moved to carry the doup threads across the body of the chenille in a manner indicated in Figs. 27, 28, 30 and 31. Any suitable means may be provided to incorporate the weft with the warp, the weft incorporating means being preferably and herein shown as such as to effect the positioning of separate lengths of weft, to the laying of which, however, my invention is obviously not restricted.

The chenille machine is provided with a reed 62 shown most clearly in Figs. 1 and 5 as fast upon the upper end of a reed frame or lever 63, itself loosely mounted for rocking movement upon the shaft 38 and having an arm 64 carrying at its outer end a roll 65 positioned in the cam track 42, whereby said reed is moved to and fro to beat up the weft in a manner not necessary more fully to describe. Carried by the said reed 62 is a suitable severing instrumentality for the weft thread, the latter being indicated at 66 in Fig. 5. Herein for the purpose I have provided two cutting members, the stationary member whereof is indicated at 67 in Fig. 5, and the sliding member whereof is indicated at 68, a spring 69 being secured to the reed to hold said cutting members in cutting relation. The sliding member 68 is prolonged below the reed, as indicated at 70 in Fig. 5, and is provided with a roll 71 riding upon a suitable stationary cam 72 upon the framing of the machine and held in engagement therewith by a suitable coil spring 73. The construction and relation of parts are such that immediately upon the positioning of a weft length in the shed, said length is severed from the body of the weft.

Figure 3:
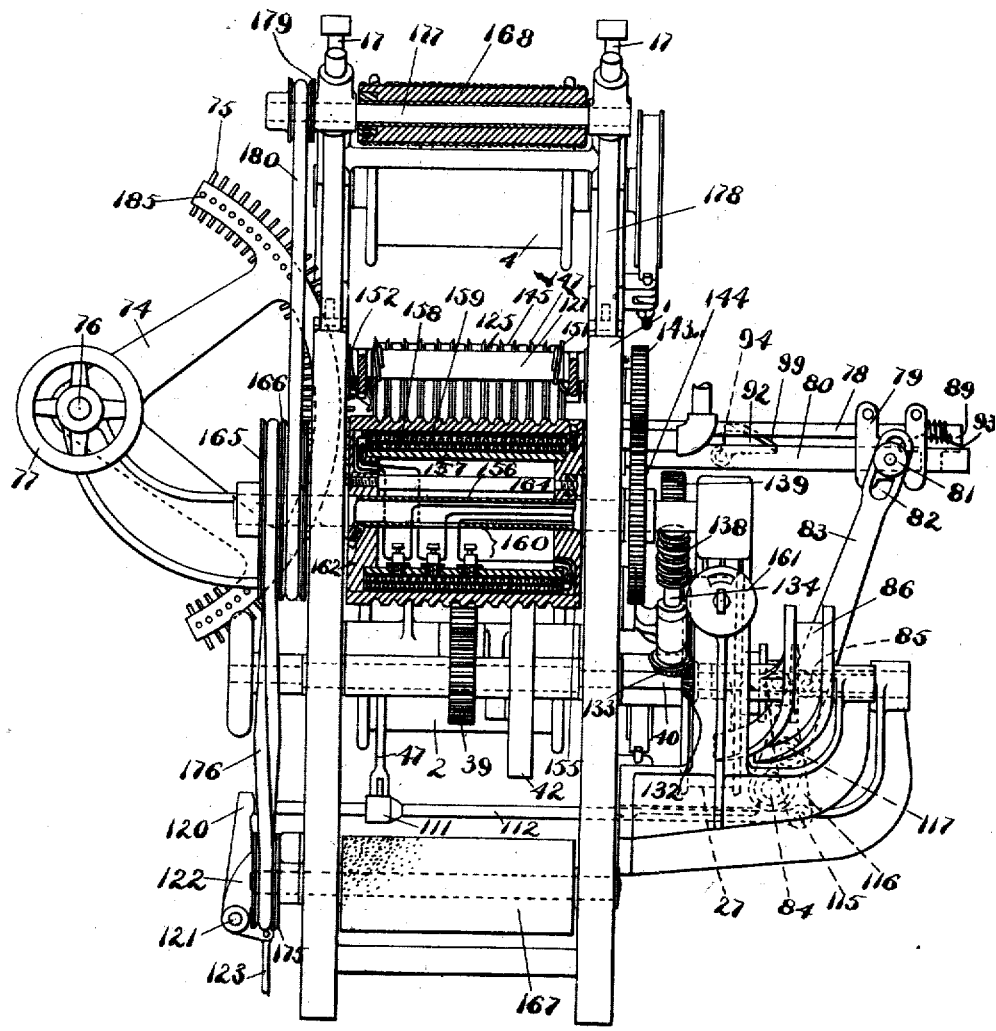
Fig. 3 is a view of said machine partly in end elevation and partly in transverse vertical section.
Figure 4:
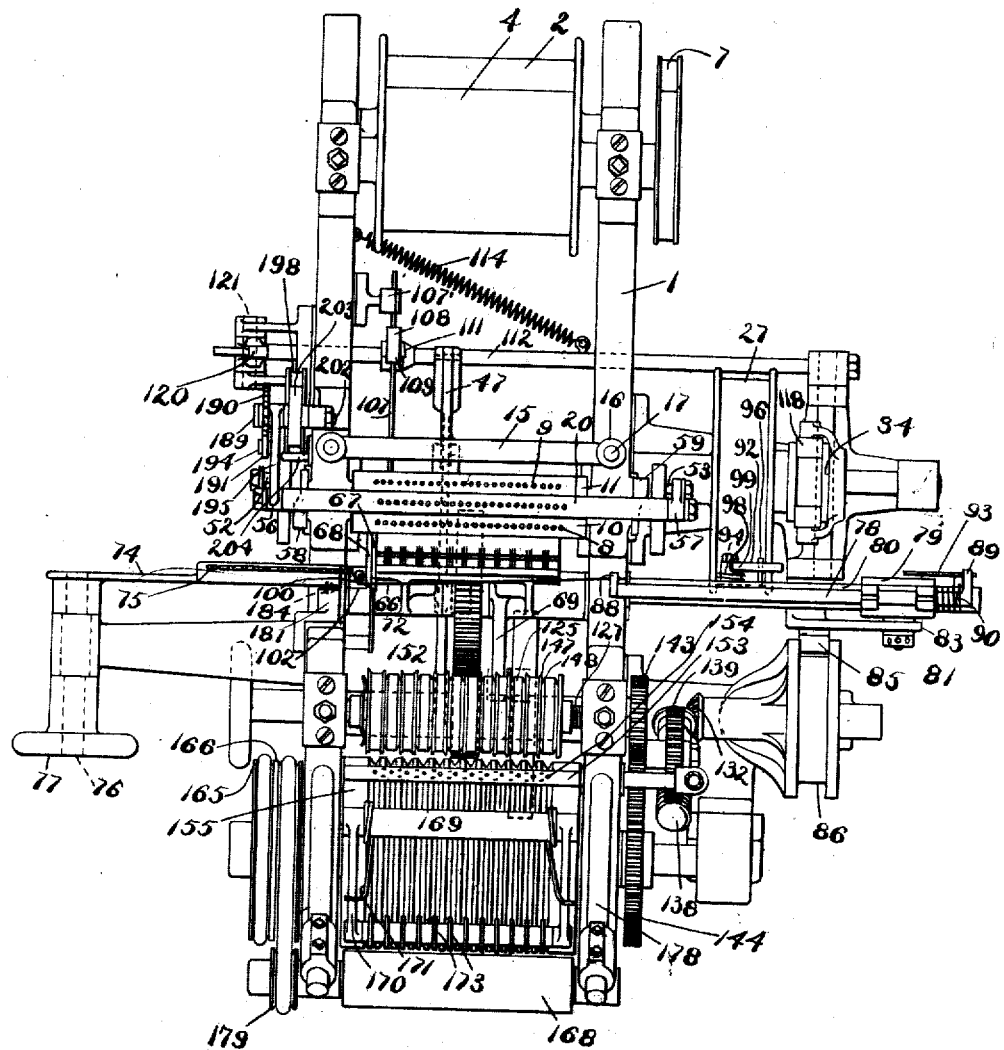
Fig. 4 is a plan view of the entire machine constituting the preferred embodiment of the invention.

Any suitable means may be provided to present a single weft or any one of a plurality of weft threads to the weft needle or filling carrier. If a plurality of weft threads be employed, they may differ among themselves in color or otherwise. In Fig. 3 I have represented at 74 a portion of a weft magazine having a number of weft thread tubes 75, each of which is adapted to carry a suitable weft thread for presentation to the weft needle or other means for inserting the selected weft thread. The magazine 74, if employed, may be selectively operated in any suitable manner, either automatically or manually. Herein for the purpose, I have represented the shaft 76 of said magazine as having fast thereon a hand wheel 77, by means of which the desired weft thread may be presented to the weft needle.

The weft needle may be of any suitable character and may be operated in any suitable manner. Herein for the purpose, and referring more particularly to Figs. 3, 4 and 11 to 16, I have represented the weft needle at 78, it being mounted in a bracket 79, itself mounted for sliding movement transversely of the machine upon a guide 80 laterally extending from the machine frame as indicated most clearly in Fig. 3. In order to impart sliding to and fro movement to the weft needle, the bracket 79 thereof has a pin 81 extending through a slot 82 in the upper end of a lever 83 pivoted at 84 upon the machine frame and having a roll 85 received by the groove of a cam 86. The said cam 86 is fast upon the shaft 40.

As indicated most clearly in Figs. 14 and 15, the needle 78 is provided with two jaws 87, 88, which are adapted to be opened to seize the weft thread when in the position indicated at the extreme right in Fig. 11, to close thereon, and again to open to release the said weft thread when the proper length thereof has been positioned in the shed. In order to impart the described movements to the jaws of the weft needle, I have made the upper jaw 88 movable, and at the opposite end of the needle 78 I have provided a laterally extending lug 89, which normally is downwardly pressed by coil spring 90 to close said jaw against the relatively fixed jaw 87.

The guide 80 is herein represented as provided with a longitudinal dove tailed groove 91 within which are received the swinging jaw opener 92 and the fixed jaw opener 93. For this purpose, said openers are respectively provided with bolts 94, 95 having T heads received within the groove 91. The jaw opener 93 is held in fixed but adjustable position so as to open the jaws when the needle 78 is at its extreme left hand position viewing Fig. 12, that is, when the proper length of weft has been positioned in the shed. The opener 92, however, is pivotally mounted upon its bolt 94 (adjustable in the slot 91) and is permitted a limited swinging movement by means of the pin 96 in said groove 91 entering the slot 97 in said opener. A coiled spring 98 is provided acting normally to retain the swinging jaw opener 92 in the position shown in Fig. 12.

As the weft needle 78 moves toward the right viewing Figs. 11 and 12, the lug 89 rides up the inclined surface 99 of said swinging jaw opener 92 and thereby the jaws are opened as indicated in Fig. 14, and the end of the selected weft thread that is protruding from the proper thread tube 75 is grasped. If desired, the construction and relation of parts may be such that the jaws close directly upon the selected thread or they may close upon the thread tube of the selected thread and thereafter slide off onto the thread thereof. In either case, the jaws close upon the thread and in the return movement of the weft needle,—that is, toward the left viewing Figs. 11 and 12, the lug 89 rides under the overhanging inclined portion 92 of the swinging jaw opener and in passing from beneath the same tilts said jaw opener into the position shown in Fig. 16, after which said jaw opener resumes the position shown in Fig. 12, and the cycle of operations is repeated.

Preferably I provide means whereby the machine is stopped if a length of weft thread is not properly positioned by the weft needle or filling carrier 78. For this purpose any suitable means may be provided, but preferably I provide a feeler or other member adapted to bear against the inserted or positioned length of weft thread, and the presence of which inserted or positioned weft thread prevents the operation of the stop mechanism.

Herein for the purpose I have provided a feeler or other suitable member 100, shown most clearly in Fig. 23, as carried by the upper end of a lever 101 pivoted at 102 upon the machine frame and having a laterally extending projection 103 preferably carrying a roll 104 extending into the path of a cam 105 upon the drive shaft 22. The lower end of the lever 101 is pivotally connected at 106 to a bar 107 held for sliding movement in a guide 107' and having fast thereon or having formed therewith a member or abutment 108, the corner 109 of which is adapted at certain times to engage the notch 110 of a collar 111 fast upon a rod 112. The rod 112 is mounted for axial movement and is mounted for lateral movement in a slot 113 in the machine framing, it being normally held in the position shown in Fig. 23 by a coil spring 114. The inner end of the rod 112 is pivotally connected at 115 to a lever 116 pivoted upon the framing at 117 and having a roll 118 at its opposite end adapted to engage the spool 34 upon the drive shaft 22, the construction being such that when the rod 112 is moved toward the right viewing Fig. 25, the spool 34 is moved to the left and the belt carrying portion 27 of the pulley is rendered loose, thereby stopping the machine.

The roll 104 of the lever 101 is so positioned that as the high portion of the cam 105 passes in a clockwise direction from contact with said roll 104, the latter moves into the position shown in Fig. 23, thus bringing the feeler 100 into contact with the inserted weft thread 66, and further movement of said roll 104 to the right viewing Fig. 23 is prevented. If, however, the weft thread 66 is not present then the lever 101 with its roll 104 moves farther toward the right viewing Fig. 23 under the influence of the coil spring 119 (see Fig. 23), thereby moving the abutment 108 into such position that it drops with the rod 107 into engagement with the shoulder 110 of the disk 111. Upon the further rotation of the cam 105 the roll 104 is moved toward the left viewing Fig. 23 and thereby moves the rod 112 bodily toward the left viewing Fig. 23, against the stress of the coil spring 114 and into the position shown in dotted lines in Fig. 24, where it is out of contact with and out of the path of movement of the lever 120 represented in Figs. 24 and 25. The said lever 120 is pivoted at 121 upon a bracket 122 and is connected by a rod 123 to a treadle, not shown. The said lever 120 is normally held by a coil spring 124 in the full line position shown in Fig. 25. When the rod 112 is moved laterally into the dotted line position shown in Fig. 24, it being then out of contact with the lever 120, the said rod is then moved axially or lengthwise to the right, viewing Fig. 25, and hence through the action of the lever 116, the spool 34 is moved to the left viewing said Fig. 25, and the machine is stopped.

In order to start the machine the treadle is moved in the proper direction to bring the lever 120 to the dotted line position shown in Fig. 25. Thereupon the coil spring 114 because of the inclined position occupied thereby moves the rod 112 laterally to the right, viewing Fig. 24, and thus brings the end thereof into alinement with the path of movement of the said lever 120. Thereupon the treadle is moved in the opposite direction, thus moving the rod 112 in an axial direction to the left viewing Fig. 25, and bringing the spool 34 into driving relation with the pulley 23.

In accordance with the process of my invention, I preferably weave the chenille fabric of width sufficient to provide a plurality of chenille strips, and I then continuously act upon said chenille fabric to sever the same into strips, and to form the same, which in the disclosed and preferred embodiment of my invention is done by subjecting the material (herein the strips) to a moistening action, a pressing into shape action and a drying action, whereby each of the chenille strips is brought into condition for immediate use. In accordance with my invention, the severed chenille strips are shaped, the shaping being done mainly through the application of suitable pressure, as hereinafter more fully described. Preferably each of the strips is then conveyed to some suitable collecting mechanism or device such as a receptacle.

While in order to accomplish these objects of my invention I may employ any suitable means, I preferably provide the following organization of parts.

After the fabric is formed by the interweaving of the warp threads, the weft thread and the doup threads in any suitable manner preferably as described, the fabric passes between two rolls indicated at 125, 126 in Figs. 1, 2 and 10. These rolls are mounted respectively upon shafts 127, 128 themselves mounted in suitable bearings 129, 130 in the framing of the machine, certain of which are indicated in Fig. 10. The bearings 129 are mounted for vertical or yielding movement and are normally downwardly pressed by adjustable coil springs 131, whereby the upper roll 125 is held firmly but yieldingly in cutting relation with the lower roll 126.

In order to drive the cutting rolls 125, 126, any suitable means may be provided. For this purpose I have in Fig. 2 represented the shaft 10 as having fast thereon a bevel pinion 132 meshing with a similar pinion 133 upon a shaft 134, which is mounted for swinging or arcuate adjustment by means of a bracket 135, having therein a curved slot 136 receiving a bolt 137. By reason of this construction the shaft 134 may be held in any desired position of angular adjustment and thus permit the use of change gearing.

Upon the outer end of the shaft 134 is a worm 138 meshing with and driving a worm gear 139 for which may be substituted a gear of any other diameter, and which is mounted upon a shaft 140 also having thereon a pinion 141 which meshes with a pinion 142 upon the shaft of the lower cutter roll 126 and with which gear 142 meshes a gear 143 upon the shaft 127 of the upper cutter roll 125. The pinion 141 also meshes with and drives a gear 144 upon the heating drum to be hereinafter referred to.

In this or in any other suitable manner, feeding movement is imparted to the cutter rolls 125, 126, thereby continuously to move the entire chenille fabric through and past the same, at preferably a low rate of speed.

Splined upon each of the cutter shafts 127, 128 are a series of cutting disks 145, 146, shown in section and also in elevation in Figs. 9 and 10. The disks 145 are provided with cutting edges 147, 148, coöperating with similar cutting edges 149, 150, upon the cutter disks 146. The cutting disks 145, 146, may be held in position by suitable washers and springs 151, 152, not herein necessary more fully to describe.

The cutting disks 145, 146 are shown in the drawings as made integral with sections of the rolls 125, 126, but obviously it is immaterial for the purposes of this invention whether they are so made integral or are otherwise constructed.

The said cutting disks act to sever the interposed threads of the fabric passing therebetween, while the peripheral surfaces of the rolls 125, 126 engage the opposite sides of the fabric and feed the same forwardly with suitable tension. The fabric is thus engaged and supported, and tension is imparted thereto by the said rolls substantially at the point of operation of the cutters 145, 146. By thus having the fabric engaged and fed forward under tension by the said rolls or by a similar take-up mechanism substantially at the cutting mechanism, I am able to feed the fabric directly from the weaving to the cutting mechanism without undue stress upon the chenille strips into which the fabric is formed by the cutting mechanism. By the term "substantially at the cutting mechanism," I mean at such a point with relation to the cutting mechanism that the pull of the take-up mechanism is transmitted with substantial directness to the web body and that in feeding the web to the cutting mechanism, the pull is not exerted through a substantial length of the individual severed chenille strips.

By the action of the cutter rolls the chenille fabric is thus severed into a series of narrow strips depending in number upon the number of cutting disks, and in this condition, the product is fed over or in other suitable relation to a moistening apparatus which in this embodiment of my invention is typified by a steam pipe 153 having openings 154, whereby the steam received from any suitable source, may be discharged onto the fabric.

Within the scope of my invention the chenille fabric may be steamed or otherwise suitably moistened before severance into strips instead of afterward, but preferably the steaming or other moistening operation is effected after the severing of the chenille fabric into strips. The moistening operation is preferably and herein employed by me as a part of what I term the forming operation, as a result of which operation the tuft ends of each chenille strip are brought into a compact, upstanding, substantially single mass of tufts. In such forming operation, I preferably employ means, one form of which is hereinafter described, with which the chenille strip contacts and through the agency of which the strip is caused to assume and to retain substantially the form in cross section that is illustrated in Fig. 29.

It will be observed that the moistening operation is represented as occurring after the severing operation and as occurring between the cutting rolls and the forming drum 155. The moisture, herein disclosed as steam, is thus permitted to act fully and effectively upon the tuft ends or portions of the weft or filling extending to each side of the longitudinally extending warp threads. Thus the filling of each chenille strip is effectively moistened and brought into a condition to be fully formed prior to its leaving the drum 155. The moistening is employed substantially wholly to condition the filling, any moistening of the warp threads being substantially wholly incidental.

After the chenille strips have been moistened as described they are subjected in accordance with the disclosed type of my process to a heating operation herein employed as a part of the forming operation and whereby the tufts of the strips are caused to assume and retain their proper relation with respect to each other. While for this purpose any suitable means may be provided I have herein represented a heating drum which is shown most clearly in Figs. 1, 2 and 3, at 155, it being provided with a shaft 156 having fast thereon the gear 144, previously referred to and by which it is driven. Any suitable means may be provided to heat the drum 155. Preferably, however, I provide means for electrically heating the same and for that purpose have made the drum hollow and have provided the inner cylindrical member 157 thereof with a plurality of windings 158, 159, connected by wiring indicated generally in Fig. 3 at 160 to a switch 161 which may be connected to any suitable source of electricity.

Herein the construction is such that when the switch is in one position a low heat is supplied to the drum 155 because only one layer or portion of the winding coils is in circuit; when the switch is in another position a medium heat is supplied to said drum because the other layer or portion of the winding coils is in circuit; and when the switch is in still another position a high heat is imparted to the drum, because both coils are in circuit, and their combined effect insures the high temperature desired.

The drum 155 is provided with the two heads 162, 163 held in relation to each other by suitable tie rods 164, and the hollow shaft 156 may if desired extend substantially beyond the end of the drum to the left viewing Fig. 3, so as to have fixedly positioned thereon pulleys 165, 166 or other means for transmitting motion to other parts of the apparatus, and herein to a take-up or sand roll 167 and to a guide roll 168, shown most clearly in Figs. 2 and 3, and hereinafter more fully referred to. As shown most clearly in Figs. 3, 4, 9 and 10, the drum 155 is provided with a series of circumferential grooves each encircling the drum and in each of which is received one of the chenille strips. These grooves are substantially U-shaped in cross section and cause the tuft or weft portions of the strip to be bent upward, thereby bringing the opposite ends of the tufts into substantially a compact, upstanding, single mass of tufts.

Preferably I provide means to hold the severed strips of chenille upon the heating drum by which the forming of the chenille is effected. While for this purpose I may provide any suitable means I have in Figs. 2 and 19 shown a tie rod or other cross member 169 whereon are loosely pivoted a plurality of arms 170 normally downwardly pressed by suitable coil springs 171. The outer ends of said arms 170 are connected by a shaft 172 having thereon a series of rolls 173 corresponding in number to the number of chenille strips and each of proper width to be received within one of the circumferential grooves 173' upon the heating drum. In this or in any other suitable manner, the separated chenille strips are held in position upon the heating drum and are subjected to such part of a "forming" operation thereon. The chenille strips are maintained in surface contact with the heating drum throughout a sufficient portion of the periphery of the latter (the drum being preferably driven in the direction of feed of the chenille strips), and the formed strips, indicated generally at 174 in Fig. 1, extend downwardly about the sand or other suitable final take-up roll 167 heretofore referred to, and thence upwardly over and about the guide roll 168, the chenille strips then passing downward into suitable receptacles corresponding in number to the number of said strips, and which may be roving cans or the like.

The sand roll 167 is provided with a pulley 175 passing about which and the pulley 165 is a belt 176, whereby the sand roll is driven and preferably at a speed very slightly faster than that of the cutting rolls, the construction, however, being such that the sand roll can slip, if necessary. In this manner I prevent the rupture or impairment of the chenille strips which is apt to occur if the said take-up mechanism be driven without capacity for such slippage.

The guide roll 168 is fast upon a shaft 177 mounted in the arms or brackets 178 extending upwardly from the framing of the machine, said shaft having thereon a pulley 179 about which and the pulley 166 upon the shaft of the heating drum 155 passes a belt 180 whereby the guide roll 168 is preferably driven at a speed slightly higher than that of the sand roll 167. Said guide roll 168 is preferably provided with a fabric or other suitable friction surface.

The magazine 74 for the weft tubes may be held in established relation with the weft needle in any suitable manner. For this purpose, I have represented the main framing of the machine as having thereon a casting or bracket 181 shown most clearly in Fig. 26. The said casting or bracket is provided with a socket 182 receiving therein a coiled spring 183 upon which rests a roll 184 adapted yieldingly to engage any one of a series of notches or shallow sockets 185 arranged in the curved surface of the magazine 74 and by which said magazine is held in proper position.

A very important feature of my invention consists in the provison of means and in a process whereby the chenille strips may be made ready for the rug or other weaving machine wherein the ultimate product is made. Heretofore so far as I am aware, it has been customary to weave a chenille fabric in a machine and in certain cases to cut said fabric into strips in said machine or as it issues therefrom. Thereafter and in other machines the chenille strips have been steamed and formed after which said prepared chenille strips might be supplied to the rug weaving loom. Inasmuch as it has heretofore generally been necessary to start the chenille machine or machines days or even weeks before the commencement of the weaving operation proper, it has been customary when the chenille strips have been steamed and formed, then to start the rug weaving operation upon a number of different looms, the rug being thus woven in sections to be afterward sewed together. Not only has this operation been a slow one, but it has been necessary to keep properly separated various portions of each length of chenille strip, so that the proper portion may be supplied to the several rug weaving looms. For example, assuming that heretofore the rug has been woven in four sections, each extending transversely of the rug, it is evident that depending upon the pattern the first portion of all the chenille strips must be used in weaving the first section of the rug, the second portion of the chenille strips must be used in weaving the second section of the rug, and so on throughout the four sections of the rug. Assuming, therefore, that the chenille fabric is severed into twelve strips, it will be evident quite a large number of receptacles are necessary to receive and keep separated the various chenille strips for the several rug sections, and that the entire process is an exceedingly slow one.

In accordance with my invention it is possible to start the weaving of the rug almost simultaneously with the commencement of the operation of the chenille forming machine. Assuming that the single chenille forming machine produces a product as rapidly as the same is used in the rug weaving machine, it will be clear that as soon as the chenille strips issue from the chenille machine herein disclosed in their woven, slitted, moistened and heated condition, they are ready for immediate use in the rug weaving machine. It is possible by the use of my invention to form the rug in a single piece much more rapidly than it has heretofore been formed in a series of pieces. The rug may be woven of a single piece by commencing the weaving operation at one end thereof and weaving down to the middle of the rug from which point onward the pattern is usually or may be reversed, and to provide for which reversal the further weaving is effected by simply reversing the chenille strip or strips end for end, and so bringing the color scheme or effect thereof in the proper relation. It will be evident from the foregoing description that the chenille strips comprise the weft of the rug, the warp thereof being composed of any suitable material. In the practice of my invention, and referring to the disclosed embodiment of the invention, I preferably maintain the warp threads under a continuous tension from the let-off through and past the take-up, and while said warp threads are maintained under such tension, I preferably perform the four operations of weaving, cutting the fabric into strips, moistening by steam, and heating and drying the strips.

By cutting and steaming or otherwise suitably moistening the strips in the same machine wherein the cloth is woven or by effectively maintaining the tension, the original alinement or spacing is preserved, whereas if the fabric be removed from the loom or weaving mechanism upon the severance of the fabric into strips, it is extremely difficult to secure the proper registration and alinement in subsequent machines.

Referring to Figs. 27 to 31, wherein the weaving of the chenille fabric is diagrammatically indicated, threads of the back warp harness are indicated at $a$, those of the front warp harness are indicated at $b$, and those of the doup harness are indicated at $c$. The weft of filling thread is indicated at $d$. The filling threads $d$ are interwoven with the warp threads $a$ and $b$ as indicated in the several figures of the diagram, and the doup threads $c$ are crossed back and forth, each through its own section or portion of the chenille fabric as indicated most clearly in Figs. 30 and 31.

It will be evident from the foregoing description that the chenille fabric is provided with weft of filling threads the colors of which are preferably changed in accordance with the pattern of the rug or other product that is to be ultimately woven. In order that the chenille may be formed of the proper color, that is, in order that the proper color of weft may be furnished from time to time to the weft needle or filling carrier, I may provide any suitable pattern or color indicating mechanism. For the purpose I have in Figs. 20, 21 and 22, indicated certain mechanism adapted to be mounted upon the framing of the machine and to be operated in a step by step manner from some moving part thereof, as for example by the rising movement of the doup harness. In carrying into effect this portion of my invention I preferably provide a continuous strip of paper or other suitable material, which has been previously ruled off into rectangles, which are painted or otherwise colored to indicate the color of the weft threads that are to be used in sequence. The said paper strip is indicated at 186 in Figs. 20 to 22 and the differently colored rectangles thereof are indicated most clearly at 187 in Fig. 22 the strip being herein of the width of two rectangles. The said strip is passed about a roll or drum 188 fast upon a shaft 189 mounted in suitable bearings upon the machine frame and having fast thereon a ratchet wheel 190 with the teeth of which is adapted to engage either end 191 or 192 of a double ended pawl loosely pivoted upon a pin 194 itself mounted upon a lever arm 195 loosely mounted upon the shaft 189. A coil spring 196 connects the lever arm 195 with the head 197 of said double ended pawl, so as to hold either end of said pawl in meshing relation to the teeth of the ratchet wheel 190. The lever arm 195 is normally downwardly spring pressed by a coil spring 198 connected at one end to said lever arm and at its other end to the framing of the machine as indicated at 199 in Fig. 21. The head 200 of the lever arm 195 extends into the path of the vertical reciprocations of the doup harness frame 20, whereby each lifting or rising movement of the doup harness frame moves the roll or drum 188 one step forward or permits said roll or drum to be moved one step in the opposite direction, depending upon which end 191, 192 of the double ended pawl 193 is in meshing relation to the ratchet 190. It is of course evident that the step by step or other suitable movement of the drum 188 may be inaugurated from some other suitable portion of the machine but preferably I effect such movement in the manner indicated.

In order to hold the strip 186 in non-slipping relation to the roll or drum 188 I preferably provide a presser roll 201 mounted upon a stud 202 in the framing of the machine and provided with a rubber or other suitable surface 203 to engage the strip 186.

The pattern or color indicating apparatus is preferably used with that form of my invention wherein the weft thread magazine is manually moved from time to time in accordance with the pattern, though it is evident that its use is not limited thereto. It is, however, preferably positioned in proximity to said magazine so that the operator who is in a position to turn the hand wheel 77 may observe the color scheme of said strip 186.

In order that the color scheme of the strip 186 may be accurately and yet readily observed, I preferably provide means whereby the portions of the strip 186 that are not then under observation are masked or concealed from the operator, whereby only the single rectangle indicating the color of weft that is being used is exposed. While for this purpose any suitable means may be provided, I have herein indicated a mask 204 shown most clearly in Fig. 21 as secured to the framing of the machine and extending upward therefrom in a curved path which may be concentric with the periphery of the roll or drum 188. The said mask 204 is provided with a single opening of the full width of the strip 186 and of the length of one rectangle thereof. Mounted upon the first mask 204 is a second mask 205 which may be slid upon the first mask 204 in a direction circumferentially of the roll or drum 188 in any suitable manner and preferably manually, as by a handle or projection 206. Said second mask 205 is provided with two openings 207, 208 which are arranged diagonally to each other as indicated in Fig. 22. The second mask 205 is mounted in suitable guides 209 or otherwise upon the first mask and the construction and relation of parts are such that either opening 207 or 208 may be brought in register with the large opening in the first mask 204 so as to permit the strip 186 to be observed through the registering openings. When the mask 205 is in the position indicated in Fig. 22 the color scheme of the strip 186 is observable through the opening 207, and said strip is continuously observed through the opening 207 so long as the strip 186 is fed in one direction, say, upward viewing Fig. 22. When the end of a pattern has been reached as for example, when a sufficient amount of chenille has been formed to extend in the rug weaving operation to the middle of the rug and the pattern to be reversed, then manually or otherwise the pawl 193 is reversed, thus reversing the direction of movement of the strip 186. At the same time the second mask 205 is moved downward, viewing Fig. 22, to permit the strip to be observed through the opening 208 and the opening in the mask 204. It will thus be observed that the rectangles at one side of the longitudinal center of the strip 186 control when the strip is fed in one direction and the rectangles at the other side of the longitudinal center of the strip 186 control when the strip is fed in the opposite direction.

I have stated that the spool or beam 2 for the warp threads 3 and the spool or beam 4 for the doup threads 5 are provided with suitable tension means. The tension thus imparted to the warp threads is maintained to a greater or less degree until at least the passage of the chenille strips from the sand roll. In other words, the warp threads and the resulting fabric are kept under continuous tension from the time of the let-off of the warp threads to and including the time of the take-up of the resulting chenille strips. In effecting this tension, the positively driven cutter rolls having the series of cutting disks 145, 146 effectively coöperate as the peripheral surfaces of said disks firmly engage the fabric and feed the same positively forward at the same time that they sever such fabric into chenille strips, it being again pointed out that the cutter rolls upon the two shafts 127, 128 are held firmly but yieldingly in contact with each other by the springs 131 and so as to effect the forward feeding of the chenille strips under proper tension. Thus the said cutter rolls act as a take-up for the chenille strips. While the material is thus maintained under continuous tension, I subject it to the several operations or steps herein disclosed including the interweaving of the weft threads, the cutting of the chenille into strips, the moistening of the strips (or if preferred the moistening of the fabric prior to the cutting thereof into chenille strips), and the pressing into shape of the strips, the forming of the chenille strips being effected in the disclosed type of my invention by the moistening, heating and drying operations. During all this time, the chenille strips are not wound or stored, but there is a continuous operation performed thereon.

This maintenance of the warp threads under continuous tension to greater or less degree, while they or the resulting chenille strips are subjected to the defined operations, constitutes an important step of my process.

In accordance with my invention I interweave warp and weft threads, sever the resulting fabric into chenille strips, and then form the resulting strips preferably in the presence of moisture and heat while effectively maintaining the warp threads under tension. It will be evident from the foregoing disclosure that such tensioning is most effectively maintained by carrying out the entire process in one machine or apparatus.

The disclosed specific embodiment of my invention comprehends that continuous process of constructing a plurality of strips of chenille, each with its tuft ends upstanding from a central binder warp construction consisting substantially in weaving under tension a sheet of flat warps having separate filling threads forming free tuft edges of the fabric and having a plurality of parallel binding warp thread formations uniformly spaced across the fabric at substantially twice the distance of the length of outstanding tufts at its edges in the preferred embodiment of my invention; in severing the said sheet into a plurality of strips by cutting the sheet under tension midway of the binder warps; in moving the severed strips forwardly under tension and moistening the same and moving the moistened strips forwardly and pressing the same under tension while moistened, so as to bring the opposite tufts of each strip into a compact, upstanding, single mass of tufts and preferably in also passing the pressed strips forwardly under tension and during a substantial interval to dry the pressed chenille before releasing the same from tension.

It is evident that for the form of take-up mechanism herein exemplified as a sand roll, there may be substituted any other suitable form of take-up by which tension may be maintained as defined.

Referring to Fig. 29, it will be observed that successive tufts of the weft yarn when in severed condition, occupy a somewhat alternating or staggered relation, thereby making a fuller or more satisfactory chenille strip. This effect is due in part to the employment of doup warps as herein disclosed. The showing of the fabric itself in the various figures of the drawings is more or less diagrammatic.

My invention so far as the broad aspect thereof is concerned is not limited to the formation of the primary fabric by an interweaving operation, since the said fabric which is subsequently cut into chenille strips may be formed in any suitable manner. It may be formed of interwoven warp and weft threads as herein disclosed; or may be formed of weft threads united by a stitching or sewing operation as disclosed in my co-pending application Serial No. 129,073 or it may be formed in any other suitable manner. So far as I am aware, I am the first to form chenille by first forming a body or blank fabric which is continuously and by preferably the same organized mechanism severed into chenille strips which as a step of the chenille forming process are moistened and then pressed into shape preferably in the presence of heat by the same organized mechanism.

Having thus described one illustrative embodiment of my invention, I desire it to be understood that although specific terms are employed, they are used in a generic and descriptive sense and not for purposes of limitation, the scope of the invention being set forth in the following claims.

Claims:

1. That process of forming chenille comprising interweaving warp and weft threads while maintaining said warp threads under continuous tension, continuously severing the resulting fabric into chenille strips, and forming under the influence of moisture the resulting strips during and continuously with the weaving process and while under said continuous tension.

2. That process of forming chenille comprising interweaving straight warp and doup warp threads while maintaining said warp threads under continuous tension with weft threads, severing the resulting fabric into chenille strips, and during and continuously with said weaving and severing action subjecting said chenille strips to a steaming and then to an ironing action and while under said continuous tension.

3. Mechanism for forming chenille comprising in combination, means to interweave warp and weft threads, means to maintain said warp threads under continuous tension, means to sever the resulting fabric into chenille strips, means coöperating in action with said means including moistening to form the same and means to maintain continuous tension on said warp threads through the severing and forming operations.

4. Chenille forming mechanism comprising in combination, one main power means, and means operatively connected therewith to interconnect laterally and longitudinally extending sets of threads, means to sever the resulting fabric into chenille strips, and means including moistening to form said strips, said several means being organized and operatively related to maintain the weaving position of the threads.

5. Chenille forming mechanism comprising in combination, let-off means for warp threads, take-up means for chenille strips, having said warp threads incorporated therein, means for interweaving warp and weft threads, means for severing the resulting fabric into strips, and means including moistening for forming said strips, said severing means being interposed between said let-off means and said take-up means.

6. The continuous process of constructing chenille comprising interengaging longitudinally extending and transversely extending threads to form a fabric, severing the resulting fabric into chenille strips and forming the resulting strips, each of said operations being performed under effectively maintained tension.

7. The process of constructing chenille comprising interweaving warp and weft threads, severing the resulting fabric into chenille strips and forming the resulting strips, all under effectively maintained tension.

8. The process of constructing chenille comprising interweaving warp and weft threads, severing the resulting fabric into chenille strips and forming the resulting strips under the influence of moisture and heat, all said steps being performed under effectively maintained tension.

9. The process of constructing chenille comprising interweaving warp and weft threads, severing the resulting fabric into chenille strips, moistening the severed strips, pressing the severed strips into shape and drying the same, all said steps being performed under effectively maintained tension.

10. The continuous process of constructing a plurality of strips of chenille each with its tuft ends upstanding from a central binder warp which consists in weaving a sheet of flat fabric having a plurality of parallel binding warp thread formations uniformly spaced across the fabric at substantially twice the distance of the length of upstanding portions of the tuft in the complete chenille, severing the resulting fabric into chenille strips and forming the resulting strips, all said steps being performed under effectively maintained tension.

11. The continuous process of constructing a plurality of strips of chenille each with its tuft ends upstanding from a central binder warp which consists in weaving a sheet of flat fabric having a plurality of parallel binder warp thread formations uniformly spaced across the fabric at substantially twice the distance of the length of upstanding portions of the tuft in the completed chenille; severing the resulting fabric into chenille strips; moistening the severed strips; pressing the severed strips into shape, and drying the same; all said steps being performed under effectively maintained tension.

12. The continuous process of constructing a plurality of strips of chenille each with its tuft ends upstanding from a central binder warp which consists in weaving a sheet of flat warp fabric having separate filling threads forming free tuft edges of the fabric and having a plurality of parallel binding warp thread formations uniformly spaced across the fabric at substantially twice the distance of the length of outstanding tufts at its edges; in severing said sheets into a plurality of strips by cutting the sheet midway of the binder warps; and in moving the severed strips forwardly and forming the same so as to bring the opposite tuft ends of each strip into a compact, upstanding, single mass of tufts; all said steps being performed under effectively maintained tension.

13. The continuous process of constructing a plurality of strips of chenille each with its tuft ends upstanding from a central binder warp which consists in weaving a sheet of flat warp fabric having separate filling threads forming free tuft edges of the fabric and having a plurality of parallel binding warp thread formations uniformly spaced across the fabric at substantially twice the distance of the length of outstanding tufts at its edges; in severing said sheet into a plurality of strips by cutting the sheet midway of the binder warps; in moving the severed strips forwardly and moistening the same; in moving the moistened strips forwardly and pressing the same into shape and in drying the pressed chenille strips; all said steps being performed under effectively maintained tension.

14. That continuous process of constructing chenille comprising subjecting the material to the following steps in one machine and under effectively maintained tension, namely: interweaving warp and weft threads, severing the resulting fabric into chenille strips and forming the resulting strips.

15. That continuous process of constructing chenille comprising subjecting material to the following steps in one machine and under effectively maintained tension, namely: interweaving warp and weft threads; severing the resulting fabric into chenille strips; moving the severed strips forwardly and moistening the same; moving the moistened strips forwardly and pressing the same into shape, and drying the pressed chenille strips.

16. The process of constructing chenille comprising interweaving warp and weft threads, severing the resulting fabric into chenille strips, and forming the resulting strips, all under continuously, effectively maintained tension.

17. That process of constructing chenille comprising, interweaving warp and weft threads to form a fabric; severing the resulting fabric into strips; forming the resulting strips; and maintaining the weaving position of the said threads through the severing and forming steps of the process.

18. That process of constructing chenille comprising, interweaving warp and weft threads to form a fabric; severing the resulting fabric into strips; moistening the resulting strips; pressing into shape and drying the said strips; and maintaining the weaving position of the said threads through the severing, moistening, pressing into shape and drying steps of the process.

19. Chenille constructing mechanism comprising in combination, one main power means and means operatively connected therewith to interconnect laterally and longitudinally extending sets of threads, means to sever the resulting fabric into chenille strips, and means to form said strips, all said means being organized and operatively related to maintain the interconnected position of the threads as originally established, through the severing and forming means.

20. Chenille constructing mechanism comprising in combination, one main power means, and means operatively connected therewith to interweave warp and weft threads, means to sever the resulting fabric into chenille strips, and means to form said strips, all said means being organized and operatively related to maintain the weaving position of the threads through the severing and forming means.

21. Mechanism for constructing chenille comprising in combination, means to interconnect longitudinally and transversely extending threads; means to sever the resulting fabric into chenille strips, means including moistening to form the resulting strips, and means to maintain effective tension upon the longitudinally extending threads through the interconnecting, severing and forming operations.

22. Mechanism for constructing chenille comprising in combination, means for interweaving warp and weft threads, means to sever the resulting fabric into chenille strips, means to form the resulting strips, and means to maintain effective tension upon the warp threads through the weaving, severing and forming operations.

23. Mechanism for constructing chenille comprising in combination, means to interconnect longitudinally and transversely extending threads; means to sever the resulting fabric into chenille strips; and means to form the resulting strips under the influence of moisture and heat; and means to maintain effective tension upon the longitudinally extending threads through the interconnecting, severing and forming operations.

24. In an apparatus of the class described and in combination, weaving mechanism having means whereby longitudinal threads are definitely spaced apart, forming mechanism provided with grooves for such longitudinal threads definitely spaced apart proportionately to the spacing of said longitudinal threads by the weaving mechanism, and cutting mechanism interposed between said weaving mechanism and the said forming mechanism and having cutting means engageable with the transverse threads symmetrically on opposite sides of said longitudinal threads.

25. In an apparatus of the class described and in combination, weaving mechanism for introducing longitudinally extending warp threads and separate weft threads having means whereby the longitudinal threads are spaced definitely apart and whereby the extreme side edges of the fabric may be used as portions of chenille strips without substantial waste; forming mechanism provided with grooves for said longitudinal threads definitely spaced apart proportionately to the spacing of said longitudinal threads by the weaving mechanism; and cutting mechanism interposed between said weaving mechanism and said forming mechanism and having cutting means engageable with the weft threads symmetrically on opposite sides of said longitudinal threads.

26. In apparatus of the class described and in combination, weaving mechanism having means whereby the longitudinal threads are definitely spaced apart, forming mechanism provided with grooves for longitudinal threads definitely spaced apart proportionately to the spacing of said longitudinal threads by the weaving mechanism and a cutter member interposed between said weaving mechanism and said forming mechanism and engageable with the transverse threads midway between two neighboring, spaced, longitudinal threads.

27. In an apparatus of the class described and in combination, weaving mechanism, cutting mechanism for severing the transverse threads of the fabric formed by the weaving mechanism, and coöperating rolls engaging opposite sides of the web fabric substantially at the point of operation of the cutting mechanism, all organized and operatively related to maintain the weaving position of the threads.

28. In an apparatus of the class described and in combination, weaving mechanism, cutting mechanism for severing the transverse threads of the fabric formed by the weaving mechanism, coöperating rolls engaging opposite sides of the web fabric substantially at the point of operation of the cutting mechanism, and forming mechanism to receive and engage the resulting chenille strips and to form the same, all organized and operatively related to maintain the weaving position of the threads.

29. In an apparatus of the class described and in combination, weaving mechanism, cutting mechanism for severing the transverse threads of the fabric formed by the weaving operation, coöperating rolls engaging opposite sides of the web fabric substantially at the point of operation of the cutting mechanism, forming mechanism to receive and engage the resulting chenille strips and to form the same, all organized and operatively related to maintain the weaving position of the threads, and take-up mechanism to receive the formed chenille strips that issue from the forming mechanism.

30. Mechanism for constructing chenille comprising in combination, one main power means, and means operatively connected therewith to interweave warp and weft threads; means to sever the resulting fabric into strips; means to form said strips; and means to maintain effective tension upon the warp threads through the interweaving, severing and forming operations.

In testimony whereof I have signed my name to this specification.

CHARLES LEA.